Nov. 20, 1928.
L. BENNINGTON
1,692,612
ILLUMINATED POINTING HEAD
Filed May 1, 1928
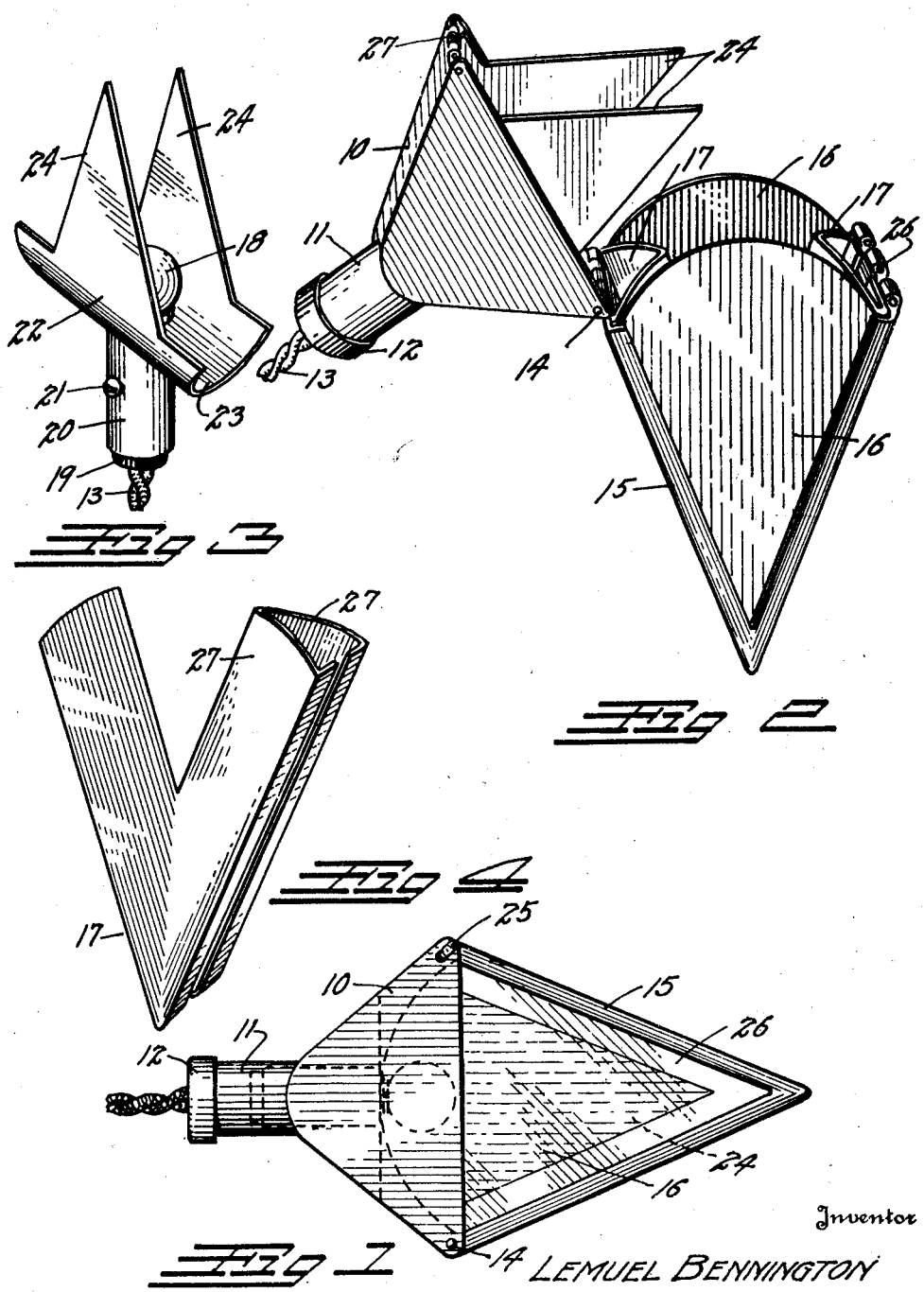
Inventor
LEMUEL BENNINGTON
By
Attorney Patented Nov. 20, 1928.

1,692,612

UNITED STATES PATENT OFFICE.

LEMUEL BENNINGTON, OF DENVER, COLORADO.

ILLUMINATED POINTING HEAD.

Application filed May 1, 1928. Serial No. 274,227.

This invention relates to an electrically illuminated indicating device and, while more particularly designed for use as an indicator for direction indicating mechanisms, it will be found valuable in many other installations.

The principal object of the invention is to provide a device which will point or indicate a direction and brilliantly illuminate the indication.

Another object of the invention is to so construct the device that it can be cheaply and easily manufactured and quickly assembled.

A further object is to provide a pointing mechanism which will be visible from both faces and in which the pointing or indicating character will be permanent, that is, it can not be affected by the fading or washing away of paints or colors.

A still further object is to illuminate a V-shaped pointer so that a single light source will give uniform and intense illumination throughout the entire area of the V.

A still further object is to arrange the housing of the device so that the electric lamp can be quickly reached for removal.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of my improved indicator.

Fig. 2 is a perspective view illustrating the indicator in the open position.

Fig. 3 is a detail view of what might be termed the primary reflector.

Fig. 4 is a similar view of the secondary reflector.

The invention comprises a housing 10, provided with a hollow stem 11 closed by means of a cap 12, through which, the electrical conductors, indicated at 13, to the illuminating lamp pass. Hinged at 14 to the housing 10, is a V-shaped channel frame 15, adapted to carry glass, celluloid, or other transparent faces 16. The faces 16 are rounded at their upper extremity and pass within the cap 10 when the device is closed. The glass faces 16 are maintained against the sides of the channel frame 15 by means of a V-shaped secondary reflector 17.

The reflector 17 comprises two reflecting faces 27 which meet along a common center plane and flare outwardly to the outer edges of the reflector. They are so arranged that, assuming the reflector to be the head of an arrow, light rays from the direction of the shaft of the arrow would be directed outwardly toward the two faces 16. The reflector 17 slides within the frame 15 and forces the faces 16 against the channel edges of the frame.

A light bulb, illustrated at 18, is carried in a suitable socket 19 which is maintained within a socket sleeve 20 by means of a set screw 21. The socket sleeve 20 is secured on a primary reflector 22. The primary reflector 22 comprises a curved portion 23 immediately behind the lamp 18 which terminates at each of its edges in two triangular points 24 at opposite sides of the lamp 18.

The position of the globe 18 can be changed, with reference to the curved portion 23 of the reflector 22, so as to adjust the focus of the light by loosening the set screw 21 and sliding the socket 19 within its sleeve 20.

The primary reflector 22 is carried within the housing 10, the ends of the curved portion 23 being beveled back to correspond to the slant of the housing sides. When in position in the housing 10 the sleeve 20 fits within the stem 11 allowing the conductors 13 to pass through the cap 12.

When all of the parts are in place, the frame 15 is swung over the housing 10 and secured in place by means of a cotter pin 25 which passes through pin openings 26 in the frame 15 and corresponding openings 27 in the housing 10.

When closed, the faces 16 extend into the housing 10 at the sides of the points 24 of the primary reflector 22 allowing the points to extend along the inner sides of the faces 16, where they serve to create triangularly shaped opaque spaces on each of the faces 16, leaving a clear transparent, V-shaped, indicating band as shown at 26, Fig. 1.

The light rays from the light 18 are thrown outwardly into the frame 15 by the curved portion 23 of the reflector 22. These rays strike the diagonally placed reflecting faces 27 on the secondary reflector 17 which direct them outwardly through the transparent V 26, serving to brightly and evenly illuminate this V throughout its entire area.

The faces 16 may be of colored glass or celluloid to give any desired color to the V 26. When viewed in the dark, the only visible portion of the device is the brilliantly illuminated V which can be employed in the nature of an arrow head for indicating a direction upon a direction indicator for automotive vehicles or upon street or road signs, entrances, exits, and in any other place where it is desired to clearly indicate a direction.

While a specific form of the improvement has been described and illustrated herein, it is desired to be understood that the same may be varied within the scope of the appended claims, without departing from the spirit of the invention.

Having thus described the invention, what I claim and desire secured by Letters Patent is:—

1. An indicating device comprising an open V-shaped frame; a housing closing the open extremity of said frame; a light source in said housing adapted to illuminate the interior of said frame; transparent faces in said frame; a reflector in said housing adapted to direct light rays between said transparent faces; and a secondary reflector in said frame adapted to turn said light rays toward said faces.

2. An indicating device comprising an open V-shaped frame; a housing closing the open extremity of said frame and a light source in said housing adapted to illuminate the interior of said frame; transparent faces in said frame and a reflector in said housing adapted to direct light rays between said transparent faces; and an opaque, pointed member on the inner sides of each of said faces adapted to outline a V-shaped transparent portion thereon.

3. An indicating device comprising a V-shaped frame, channel shaped in cross section; transparent faces in said frame; a housing closing the open side of said V; a reflector within said housing; pointed extremities on said reflector adapted to extend into said V so as to outline a V-shaped transparent portion on each of said faces and a light source within said reflector.

4. An indicating device comprising a V-shaped frame, channel shaped in cross section; transparent faces in said frame; a housing closing the open side of said V; a reflector within said housing; pointed extremities on said reflector adapted to extend into said V so as to outline a V-shaped, transparent portion on each of said faces; a light source within said reflector; and a second V-shaped reflector within said frame arranged immediately behind said V-shaped transparent portions so as to direct light rays outwardly therethrough.

5. An indicating device comprising a V-shaped frame, channel shaped in cross section; transparent faces in said frame; a housing closing the open side of said V; a reflector within said housing; pointed extremities on said reflector adapted to extend into said V so as to outline a V-shaped, transparent portion on each of said faces; a light source within said reflector; a hinge connecting said housing to said frame at one side of said V and a detachable connection between said housing and said frame at the other side of said V.

6. An indicating device comprising a V-shaped frame, channel shaped in cross section; transparent faces in said frame; a housing closing the open side of said V; a reflector within said housing; pointed extremities on said reflector adapted to extend into said frame so as to outline a V-shaped transparent portion on each of said faces; a light source within said reflector; a hollow stem projecting from said housing; a sleeve projecting from said reflector within said stem and a socket adapted to support said light source carried within said sleeve.

7. An indicating device comprising a V-shaped frame, channel shaped in cross section; transparent faces in said frame; a housing closing the open side of said V; a reflector within said housing; pointed extremities on said reflector adapted to extend into said frame so as to outline a V-shaped transparent portion on each of said faces; a light source within said reflector; and a second V-shaped reflector within said frame arranged immediately behind said V-shaped transparent portions so as to direct light rays outwardly therethrough, said second reflector comprising two V-shaped reflecting surfaces joined together along their inner edges and spaced apart along their outer edges.

In testimony whereof, I affix my signature.

LEMUEL BENNINGTON.